(12) United States Patent
Jeong

(10) Patent No.: US 7,213,730 B2
(45) Date of Patent: May 8, 2007

(54) VEHICLE ROOF RACK ASSEMBLY WITH ADJUSTABLE CROSS RAIL

(75) Inventor: Dae Seok Jeong, Hwaseong-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 532 days.

(21) Appl. No.: 10/751,025

(22) Filed: Dec. 31, 2003

(65) Prior Publication Data

US 2005/0045679 A1   Mar. 3, 2005

(30) Foreign Application Priority Data

Sep. 1, 2003   (KR) .................. 10-2003-0060773

(51) Int. Cl.
*B60R 9/00* (2006.01)

(52) U.S. Cl. ...................... 224/321; 224/323

(58) Field of Classification Search ................ 224/321, 224/323, 324
See application file for complete search history.

(56) References Cited

U.S. PATENT DOCUMENTS 4,295,588 A  10/1981 Kowalski et al.
4,616,771 A * 10/1986 Heideman ................ 224/321

FOREIGN PATENT DOCUMENTS

JP   11-034751   2/1999

* cited by examiner

*Primary Examiner*—Nathan J. Newhouse
*Assistant Examiner*—Lester L. Vanterpool
(74) *Attorney, Agent, or Firm*—Morgan Lewis & Bockius LLP

(57) ABSTRACT

The present invention relates to a vehicle roof rack assembly with an adjustable cross rail in which a guide groove is formed in both side surfaces of a side rail in a longitudinal direction and is installed on a side rail in a state that it is supported by a mounting member in which a cross rail is position-adjustable along a guide rail. The mounting member includes a locking part being locked with an inner surface of a guide groove, and an engaging part engaged with the cross rail and is supported on an upper surface of a side rail and in a guide groove of both lateral surfaces. Therefore, wind noise is significantly decreased, and an outer visual appearance is enhanced. An engaging and disengaging operation of the cross rail is easily achieved.

6 Claims, 1 Drawing Sheet

VEHICLE ROOF RACK ASSEMBLY WITH ADJUSTABLE CROSS RAIL

CROSS-REFERENCE TO RELATED APPLICATIONS

This application claims priority of Korean Application No. 10-2003-0060773, filed on Sep. 1, 2003, the disclosure of which is incorporated fully herein by reference.

FIELD OF THE INVENTION

The present invention relates to a vehicle roof rack assembly with an adjustable cross rail.

BACKGROUND OF THE INVENTION

Generally, in a passenger car, when loading a certain baggage, the baggage is loaded into the passenger compartment or trunk. However, since such space is limited, it is difficult or impossible to load baggage having a large or long size. In order to overcome the above problems, an RV (Recreational Vehicle) or SUV (Sports Utility Vehicle) has a roof rack on an upper surface of a roof panel for loading baggage thereon.

Such a roof rack includes a side rail longitudinally installed on a roof panel in forward and backward directions. A cross rail is perpendicularly installed in the horizontal direction of the side rail. The cross rail is forwardly or backwardly slidable for adjustment. In order for the cross rail to slide with the side rail, it is needed to fix both ends of the cross rail to the side rail. In addition, it is needed to forwardly and backwardly move both ends of the cross rails on the side rail.

For example, in U.S. Pat. No. 4,295,588 there is provided a bracket in which ends of a cross rail are inserted and engaged for adjusting its position, and a side rail having a slot for adjusting the position of the bracket. However, with such structures, certain problems occur. First, when turbulent air passes through the rack while driving, a significant amount of noise is generated. In addition, when the bracket that engages the slot in the side rail is engaged, the end of the slot is inserted into a groove in the bracket and it is not easy to install the cross rail and the bracket to the side rail. When disengaging the cross rail, since the cross rail and the bracket are not easily separated from the side rail, the user uses the vehicle with the cross rail and the bracket installed. Therefore, the total weight of the vehicle is increased, so that fuel consumption is increased.

In addition, the external appearance of the slot is not good and foreign substances may be easily inserted into the interior of the slot of the side rail.

SUMMARY OF THE INVENTION

Embodiments of the present invention provide a vehicle roof rack assembly comprising a side rail longitudinally installed on a roof panel of a vehicle, a cross rail disposed in a horizontal direction with respect to the side rail, and a mounting member slidably engaging the cross rail to the side rail. In a preferred embodiment, a side rail is provided with a guide groove at both sides thereof. Preferably, the mounting member comprises a connecting part that is coupled to the cross rail and a locking means that securely fixes the movement of the cross rail with respect to the side rail. The present invention significantly reduces wind noise occurring due to a slot in a conventional side rail. In addition, external appearance of the side rail is enhanced. Furthermore, it become easy to mount or dismount the cross rail on the side rail.

In a further embodiment, a vehicle roof rack assembly comprises first and second side rails configured for installation on a vehicle roof panel in a longitudinal direction. The guide rails define guide grooves along inner and outer lateral surfaces. Mounting members are configured to be received around a top surface of each side rail with inward lateral projections received in each of the inner and outer guide grooves. One projection is shorter in length and having a locking means extending therethrough for contact with its associated guide groove. The mounting members each have inwardly projecting engaging parts. At least one cross rail is configured to be received on the engaging parts and extends between the mounting members received on the side rails.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, such embodiments of the present invention are described in detail with reference to the accompanying drawings.

Figure 1:
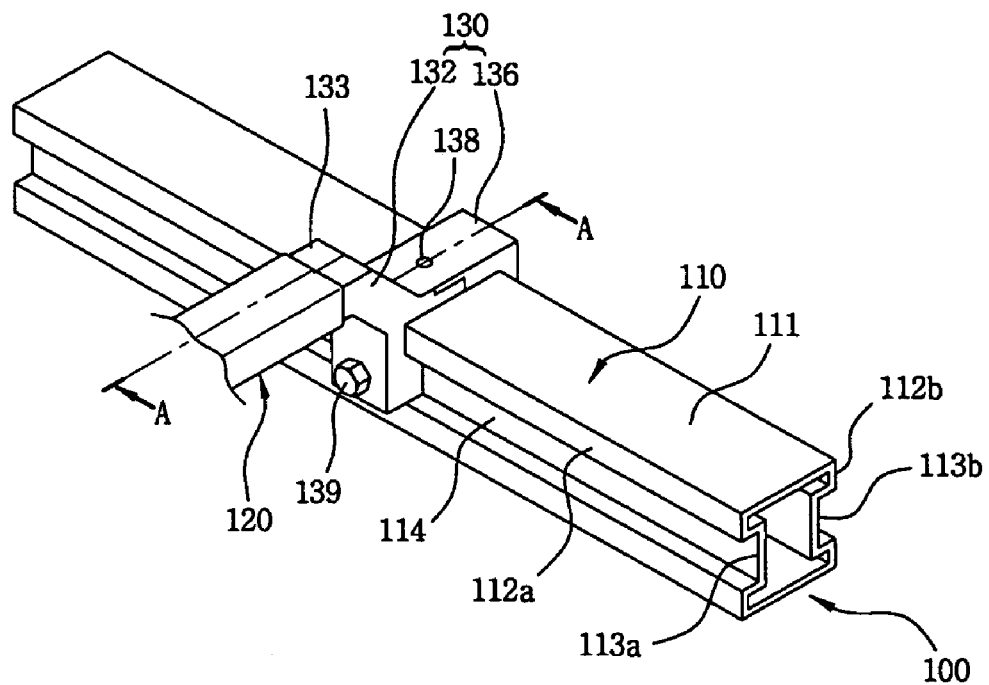
FIG. 1 is a cut-away perspective view illustrating an engaging structure between a side rail and a cross rail in a roof rack assembly according to the present invention.
Figure 2:
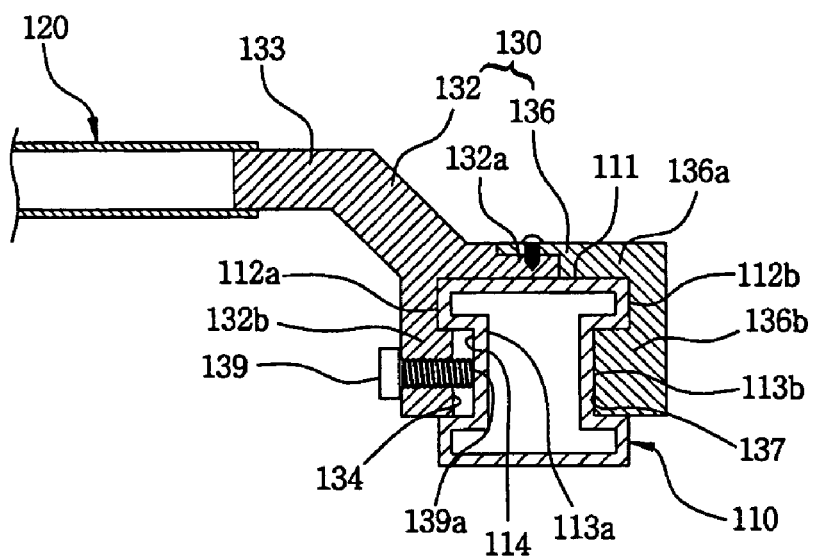
FIG. 2 is a cross sectional view taken along the line A—A of FIG. 1.

As shown in FIGS. 1 and 2, vehicle roof rack assembly 100 includes a cross rail 120 horizontally arranged on a side rail 110 that can be longitudinally installed in the forward and backward direction on a vehicle roof. The cross rail is movable forwardly and backwardly for adjustment. Guide grooves 113a and 113b are longitudinally provided on both lateral surfaces 112a and 112b of the side rail 110, wherein the cross rail 120 is supported by a mounting member 130. Mounting member 130 is position-adjustable in the guide grooves 113a and 113b and is installed on the side rail 110. The mounting member 130 also includes a locking part 139 performing a locking operation with a guide groove inner surface 114, and an engaging part 133 engaged with the cross rail 120. The mounting member 130 is supported by both lateral surfaces 112a and 112b including an upper surface of the side rail 110 and the guide grooves 113a and 113b.

The side rail 110 is preferably formed of a hollow member having closed ends. A center portion of left and right lateral surfaces 112a and 112b is inwardly bent and has a cross section of a train rail, respectively, thereby forming the guide grooves 113a and 113b.

The cross rail 120 is formed of a bar shaped hollow member wherein an engaging part 133 longitudinally extends from one side of the mounting member is inserted into the interior of the end of the same. The mounting member 130 includes an inner mounting member 132 supported by a lateral surface 112a and an upper surface 111 including an inner side guide groove 113a and having a locking part 139 and an engaging part 133. A outer mounting member 136 supported by a lateral surface 112b and an upper surface 111 includes an outer side guide groove 113b wherein the upper side support parts 132*a* and 136*a* of the members 132 and 136 are supported on the upper surface 111 of the side rail 110 are engaged with each other by an engaging part 138.

Insertion guide parts 134 and 137 are inserted in the guide grooves 113*a* and 113*b* and guided thereby. Parts 134 and 137 protrude from lower side support parts 132*b* and 136*b* of the members 132 and 136 supported on the lateral surfaces 112*a* and 112*b* of the side rail 110.

The engaging part 138 preferably is a screw capable of engaging the upper side support parts 132*a* and 136*a* of the members 132 and 136 in a state where they are overlapped.

A locking part 139 preferably is a bolt engaged through the bolthole 135 of the mounting member 130 so that a body end 139*a* locks the guide groove inner surface 114.

The mounting member according to the present invention will be described in more detail hereinafter.

First, the mounting member 130 includes an inner mounting member 132 and an outer mounting member 136 for achieving an easier attachment and detachment on the side rail 110. The inner mounting member 132 is supported by the lateral surface 112*a* and the upper surface 111 including the inner side guide groove 113*a* of the side rail 110. The outer mounting member 136 is supported on the lateral surface 112*b* and the upper surface 111 including the outer side guide groove 113*b* of the guide rail 110.

The engaging part 133 inserted into the interior of the end portion of the cross rail 120 is longitudinally extended in the vertical direction with respect to the side rail 110 in one side of the inner mounting member 132. The end portion of the cross rail 120 is engaged through the engaging part 133, so that the cross rail 120 is stably supported in a horizontal supported state with respect to the side rail 110.

The engaging and supporting portions of the inner mounting member 132 engaged and supported by the side rail 110 are formed in a shape of "T". The upper side support part 132*a* is supported on the upper surface 111 of the side rail 110, and the lower side support part 132*b* is supported on the lateral surface 112*a* including the inner side guide groove 113*a* of the side rail 110. In particular, an insertion guide part 134 inserted into the guide groove 113*a* of the side rail 110 protrudes from an outer surface of the lower side support part 132*b*.

In addition, the engaging and supporting portions of the outer mounting member 136 engaged and supported by the side rail 110 are formed in a shape of "■". The upper side support part 136*a* is supported on the upper surface 111 of the side rail 110, and the lower side support part 136*b* is supported on the lateral surface 112*b* including the outer side guide groove 113*b* of the side rail 110. An insertion guide part 137 inserted into the guide groove 113*b* of the side rail 110 protrudes from the inner surface of the lower side support part 136*b*.

In a state that the inner mounting member 132 and the outer mounting member 136 are engaged each other, they are supported on the left and right lateral surfaces 112*a* and 112*b* with respect to the upper surface 111 of the side rail 110. The upper ends of the insertion guide parts 134 and 137 of the members 132 and 136 operate as an engaging shoulder part in a corresponding one of the guide grooves 113*a* and 1113*b*, so that the inner mounting member 132 and the outer mounting member 136 are not escaped from the side rail 110.

In the inner mounting member 132 and the outer mounting member 136, the ends of the upper side support parts 132*a* and 136*a* supported by the upper surface 111 of the side rail 110 partially have a stepped shape, respectively, so that they are engaged with each other by the screw 138 in a state that the stepped portions are overlapped. When the screw 138 is loosened, two members 132 and 136 are easily disengaged.

In addition, the mounting member 130 is slidable forwardly and backwardly on the side rail 110 and includes a locking part 139 for achieving a locking operation with the side rail 110 in order to be fixed at a certain position of the side rail 110. After the cross rail 120 engaged with the mounting member 130 is forwardly and backwardly moved, the locking part is adapted to fix them at a desired position. Namely, in a state that the cross rail 120 is forwardly and backwardly moved to a desired position, when the mounting member 130 and the side rail are locked using the locking part 139; the position of the mounting member 130 is fixed, and at the same time the position of the cross rail 120 is fixed. The locking part 139 may be a fixing bolt engaged through a bolthole 135 of the mounting member 130, so that the bolt body end 139 tightens a guide groove inner surface 114

As shown in FIG. 2, the fixing bolt 139 adapted for a locking operation is engaged to the bolthole 135 formed in the lower side support part 132*b* of the inner mounting member 132. In the above state, when the fixing bolt 139 is rotated in the bolthole 135 using a tool such as a driver or a wrench, the fixing bolt 139 is horizontally forwardly advanced, and the bolt body end 139*a* strongly tightens the guide groove inner surface 114. Friction between the body end 139*a* and the guide groove inner surface 114 achieves the locking operation.

In the above locked state, since the position of the mounting member 130 is fully fixed on the side rail 110, the cross rail 120 is also fixed at the adjusted position.

Therefore, in the roof rack assembly 100 according to the present invention, when it is intended to disengage the cross rail, the screw 138 engaging the inner mounting member 132 and the outer mounting member 136 is loosened, and the mounting member 136 is disengaged. Thereafter, the fixing bolt 139 locking the inner mounting member 132 is loosened, so that the cross rail 120 and the inner mounting member 132 are disengaged from the side rail 110.

As described above, in the vehicle roof rack assembly according to the present invention, a guide groove is formed in the longitudinal direction on both side surfaces of the side rail. The cross rail is installed on the side rail in a state that it is supported by the mounting member of which movement is adjustable along the guide groove. The mounting member has a locking part performing a locking operation with respect to a guide groove inner surface and an engaging part engaged with the cross rail and is supported on an upper surface of the side rail and the guide grooves of both lateral surfaces of the same. Therefore, wind noises occurring by a slot in the conventional side rail are significantly decreased, and an outer visual appearance is enhanced. An engaging and disengaging operation of the cross rail is easily achieved.

What is claimed is:

1. A vehicle roof rack assembly, comprising:
   a cross rail configured to be installed in a substantially lateral direction on a roof panel of a vehicle;
   a side rail configured to be installed in a substantially longitudinal direction on the roof panel of the vehicle, said side rail comprising an upper surface and first and second lateral side surfaces, said lateral side surfaces comprising first and second guide grooves, respectively; and a mounting member slidably engaging the cross rail to the side rail, the mounting member comprising:
- an inner mounting member comprising a side surface supported by the first lateral side surface of the side rail, including the first guide groove, an upper portion supported by the upper surface of the side rail, an engaging part configured to engage the cross rail, and a locking means for preventing movement of the cross rail with respect to the side rail; and
- an outer mounting member comprising a side surface supported by the second lateral side surface of the side rail, including the second guide groove, and an upper portion supported by the upper surface of the side rail;
- wherein the upper portions of the mounting members are engaged with each other by an engaging means.

2. The vehicle roof rack assembly according to claim 1, wherein said side rail is formed of a hollow member having closed ends, and a center portion of each of the lateral surfaces is inwardly bent and has a cross section of a train rail, thereby forming the guide grooves.

3. The vehicle roof rack assembly according to claim 1, wherein said cross rail is formed of a bar shaped hollow member wherein the engaging part laterally extends from a side of the inner mounting member and is inserted into an interior of an end of the cross rail.

4. The vehicle roof rack assembly according to claim 1, wherein insertion guide parts inserted in the guide grooves and guided thereby protrude from lower side support parts of the members supported on the lateral side surfaces of the side rail.

5. The vehicle roof rack assembly according to claim 1, wherein said engaging means is a screw capable of engaging the upper portions of the members in a state that they are overlapped.

6. The vehicle roof rack assembly according to claim 1, wherein said locking means is a bolt engaged through a bolt hole of the inner mounting member so that a body end locks an inner surface of the first guide groove.

* * * * *